United States Patent [19]

Berger

[11] Patent Number: 4,640,594

[45] Date of Patent: Feb. 3, 1987

[54] TEAR PUMP CONTACT LENS

[76] Inventor: Richard Berger, P.O. Box 189, Woodbury, N.Y. 11797

[21] Appl. No.: 649,983

[22] Filed: Sep. 13, 1984

Related U.S. Application Data

[63] Continuation-in-part of Ser. No. 337,725, Jan. 7, 1982, abandoned.

[51] Int. Cl.$^4$ .............................................. G02C 7/04
[52] U.S. Cl. .............................................. 351/160 R
[58] Field of Search ............... 351/160 H, 160 R, 161, 351/162

[56] References Cited

FOREIGN PATENT DOCUMENTS 1170600  9/1958  France ........................... 351/160 R
2248527  5/1975  France ........................... 351/160 R

*Primary Examiner*—John K. Corbin
*Assistant Examiner*—Scott J. Sugarman

[57] ABSTRACT

This invention relates to improvements in ophthalmic lenses and in particular to a three zone lens having a central optical portion connected by and secured to an intermediate tear pump zone which is secured and connected to an outer zone for retaining the lens on the eye. The central zone may function as a correction of vision or as a protection for the cornea of the eye. This central zone acting in conjunction with the intermediate tear pump zone of a bellow shape combine to form a pumping mechanism that is activated by the normal blinking of the eyelid. This pumping action causes tear fluid to be expelled and replenished in the area located behind the central zone and above the cornea of the eye. The fluids ingress and egress from this area through the tear layer located between the outer zone of the lens and the surface of the eye.

4 Claims, 4 Drawing Figures

TEAR PUMP CONTACT LENS

BACKGROUND OF THE INVENTION

This application is a continuation-in-part of application, Ser. No. 337,725 filed Jan. 7, 1982, now abaondoned.

Presently, there are two major types of contact lenses on the market. The hard non-deformable type which do not allow oxygen to flow to the cornea of the eye and the soft type which, because of their permeable nature allow oxygen to flow to flow to the cornea of the eye. The hard lenses therefor have the disadvantage of requiring removal on a daily basis to allow oxygen to reach the cornea, but have the advantage of being relatively easy to maintain. The soft lenses, have the advantage of longer wear, however, they are much harder to maintain. The maintenance problem is a result of their permeable nature which picks-up debris and therefor special care must be used to keep them clean otherwise an unhealthy environment for the cornea of the eye will be created.

There have been some attempts to obtain the benefits of both hard and soft contact lenses without the drawbacks of either. These attempts are reflected in U.S. Pat. Nos. 3,468,602 and 3,594,674 both of which were issued to Hyman Rosen. In both of these patents, Mr. Rosen attempts to obtain a soft contact lens with a cleaning action to rid the area between the cornea of the eye and the rear of the central portion of the contact lens of any unwanted debris. His solution is to have a yieldable and resilient lens with a central portion that is deformable in response to exertion and release of pressure induced by eyelid movement.

Said lens has an outer peripheral area engageable with the eye and is provided with channels on the inner side to permit ingress and egress of eye or tear fluids to and from the domed area between the lens and the cornea of the eye, which serves as a fluid chamber. An intermediate thickened or or reinforced peripheral area connected to the edge of the domed area serves as the support or fulcrum for a diaphragmatic action of the domed area and also serves to connect with the outer peripheral engageable area adapted to float on and adhere to the eye proximate to the cornea.

The problem with this solution, however, is that the central portion is required to be soft, resilient, deformable and yieldable and therefore is still capable of retaining unwanted debris in the porous lens. In addition, because the center portion of the lens must be yieldable or deformable to give the proper pumping or diaphragmatic action that is required to cleanse the area between the cornea of the eye and the lens, there is a danger that the lens, upon yielding or pumping could contact the cornea and cause damage. In addition it also has the drawback of requiring a weakened intermediate zone between the center portion and the outer portion of the lens to aid in the diaphragmatic action. Finally, this patent teaches the need of raised elements or channels to create passages for the debris and tear fluid to move from the area located between the cornea and the rear of the central portion of the contact lens, and the sclera area of the eye and outer portion of the lens where the tear fluid and debris is discharged from the eye. This is a result of the close fitting of the outer portion of the lens and the sclera portion of the eye that is disclosed in the Rosen patents.

It is accordingly an object of the present invention to provide an improved lens capable of long wear without the problem of debris built-up.

A further object of the present invention is to provide a central portion of a contact lens that is non-deformable to prevent the danger of said portion of the lens from coming into contact with the cornea of the eye.

A still further object is to provide a lens that doesn't require a weakened intermediate zone to aid in the pumping action.

Finally, it is an object of the present invention to provide a controlled, tear pump action between the central portion of the contact lens and the outer portion of the lens. The movement of the central portion of the lens will pump tear fluid and debris out from the area above the cornea so that is can be replaced by fresh clean tear fluid and oxygen. This creates a health environment for the cornea and can be done with avoiding the need for protusion or channels in the outer portion of the lens. This is accomplished by providing a fit between the outer portion of the lens and the sclera portion of the eye that has a retaining attraction created by the surface tension of the tear fluid acting on both the inner outer portion of the lens and the sclera area of the eye. Therefore there is no need for special fitting of the lens to individual eyes because the lens doesn't touch the eye but merely conforms to the tear fluid on the eye.

SUMMARY OF THE INVENTION

This invention relates to contact lenses that are to be used for both visual correction and other non-corrective applications, such as cosmetic, protective, and other uses requiring long wear periods without the attendent fitting, contamination and oxygen deprivation problems associated with all presently available hard or soft contact lenses.

Since the length of time a properly designed and fitted contact lens can be worn safely is directly related to the lens' physical, biochemical, chemical, and inertness properties, as well as its optical properties, the structure which is the subject of this patent, is capable of optimizing all of these parameters without compromise, resulting in a contact lens that can be worn indefinitely.

In essence the structure of this contact lens embodies a central optical zone, which is soft but semi-rigid, non-deformable and non-absorber of body fluids secured to an intermediate radially tear pump zone of bellows shape which allows translational movements in the axial direction and which is further secured to an outer zone which serves to retain the entire structure on tear fluid to the outer surface of the eye. The structure of the central optical zone as it is secured to the outer zone by the tear pump zone creates a pumping element to pump cleansing tear fluid to the eye. The forces needed for the pumping action are created by the naturally occuring blink cycle of the eyelid. During the first phase of the blink cycle the eyelid descends and exerts a force, on the central optical zone, in a direction axially inwards towards the cornea. This force is transnmitted to the tear pump stucture of the intermediate zone which is capable of flexing in a precisely controlled axial direction and distance towards the cornea of the eye, but never touching the cornea. It should be noted that by using this type intermediate tear pump structure there is no need for a change in cross sectional thickness in the intermediate zone of the lens which could create manufacturing, weakening and fit problems. This inward motion of the central zone pumps an aliquot portion of tear fluid and debris radially outward from the tear filled space between the anterior surface of the cornea and the posterior surface of the contact lens. This tear fluid and metabolic and cellular debris then passes under the outer zone of the lens through the tear fluid located between the lens and sclera area of the eye, where it is then rejected from the eye. During the final phase of the blink cycle, as the eyelid returns to its upper position, the pressure on the central zone is removed and the flexed intermediate tear pump zone exerts a restoring force in a direction to bring the central zone back to its equilibrium position. This motion creates the displacement needed to draw fresh tear solution and oxygen into the tear chamber.

Materials that could be satisfactory for this lens structure are non-absorbant, non-toxic, semi-rigid, transparent materials ranging in thicknesses from 0.25 to 0.35 mm., such as the number of commercially available polyethylene/polypropylene, polyethylene/polyvinylacetate copolymer compounds. Polyurethanes, halogenated olefins and vinyls are other examples of materials that could be fabricated into the described contact lens design. Other materials that have similar properties also could be used.

The fabrication of these compounds into a finished contact lens is preferentially done by standard commercial plastic processing techniques including but not limited to Injection Molding, Casting, Spin Casting, Powder Molding, Thermoforming, Extrusion, or combinations of the above.

DETAILED DESCRIPTION OF THE PREFERRED EMBODIMENT

Figure 1:
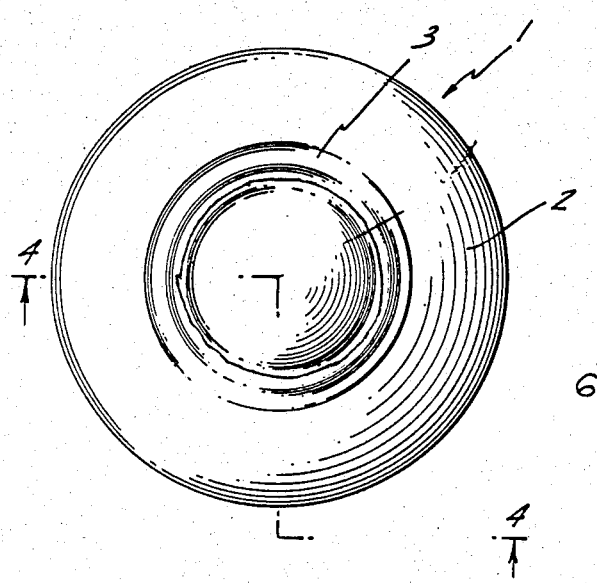
FIG. 1 is a top plan view of the lens.

Referring now to FIG. 1, contact lens 1 is made up of three sections, outer zone 2, of a soft and resilient material; intermediate tear pump zone 3 of a collapsable structure said structure being resilient in nature, and central optical zone 4 of a non-deformable structure having optical properties. Said contact lens 1 is formed such that optical zone 4 fits over the cornea 5 of the eye 6, but may or may not cover the entire cornea 5. The outer zone 2 covers a portion of the sclera 7 of eye 6. The contact lens 1 while fitted to be retained on eye 6 never touches eye 6 but at every point rides or sits on tear layer 8 located between the exterior of the eye 6 and the interior of lens 1. Tear layer 8 because of the interaction of its surface tension between the lens 1 and eye 6 causes the contact lens 1 to remain secure to the eye 6 without touching the eye 6.

Resiliently connecting outer zone 2 to optical zone 4 is intermediate tear pump zone 3 which is of uniform thickness or substantially uniform thickness. Intermediate tear pump zone 3 is capable of being deformed or movable in a precisely controlled direction and distance as if it were an annular spring connecting outer zone 2 with optical zone 4. Located directly behind optical zone 4 above the cornea area 5 of the eye 6 is what we shall call tear chamber area 9. In order to keep cornea 5 in a healthy environment, this tear chamber area 9 must be kept free of metabolic and cellular debris or build-up while constantly being supplied with fresh tear fluid and oxygen. This is accomplished by this invention by having the shape of the lens 1 being such that when it is placed over the eye 6 the tear area 9 will be formed between the surface of the cornea 10 and the inside surface 11 of optical zone 4.

When the lens 1 is fitted on the eye 6 the inside surface 11, because it is spaced from the outer surface of the cornea 10 of the eye 6 will permit the collection of tear fluid 8 in the tear area 9. This aids in the correction of corneal surface astigmatism and irregularity and provides for comfort when wearing of the lens 1.

Figure 2:
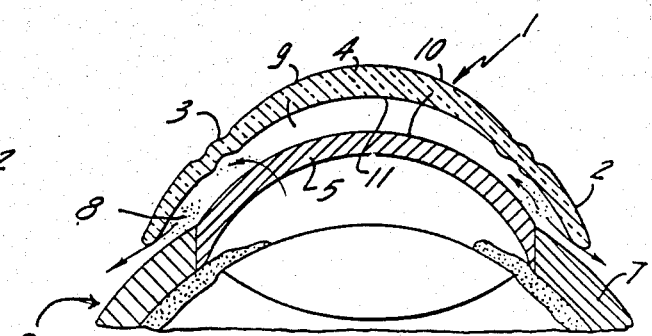
FIG. 2 is a diagramatic view of a portion of an eye with a lens of the improved tear pump construction applied thereon.
Figure 3:
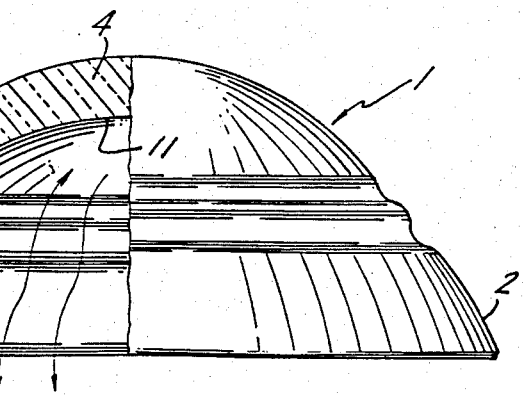
FIG. 3 is an enlarged side view of the lens, with a part thereof being shown in section through line 4—4 of FIG. 1.

When the eyelid, not shown, closes and opens, the pumping or cleaning function of the tear pump zone 3 acting with the optical zone 4 of the lens 1 will cause the optical zone 4 to move inwardly a set distance thus acting as a pump which will first expel some of the tear fluid 8 out of chamber 9 through tear layer 8 located between outer zone 2 and the sclera 7 of eye 6 and then, upon the return flexure of tear pump zone 3 and optical zone 4 to their equilibrium position fresh oxygen and tear fluid 8 will be drawn back into the chamber 9. The out-flow of the fluid is indicated by the arrows in FIGS. 2 and 3. The optical portion 4 of the lens 1 in conjunction with tear pump zone 4 thus provides a hydraulic pump element and by the movement of the tear fluid 8 from within the chamber 9 through the tear layer will provide a washing action of the surface of the eye 6. While the optical part 4 of the lens moves inward under cyclic pressure, it is so spaced from the surface of the cornea by the precise spring control function of tear pump zone 3 that it does not touch the surface of the eye 6.

The construction of lens 1 is such that all portions may be integrally molded of a suitable material, or if desired the zones, 2, 3 and 4 may be separately produced and suitably united.

Figure 4:
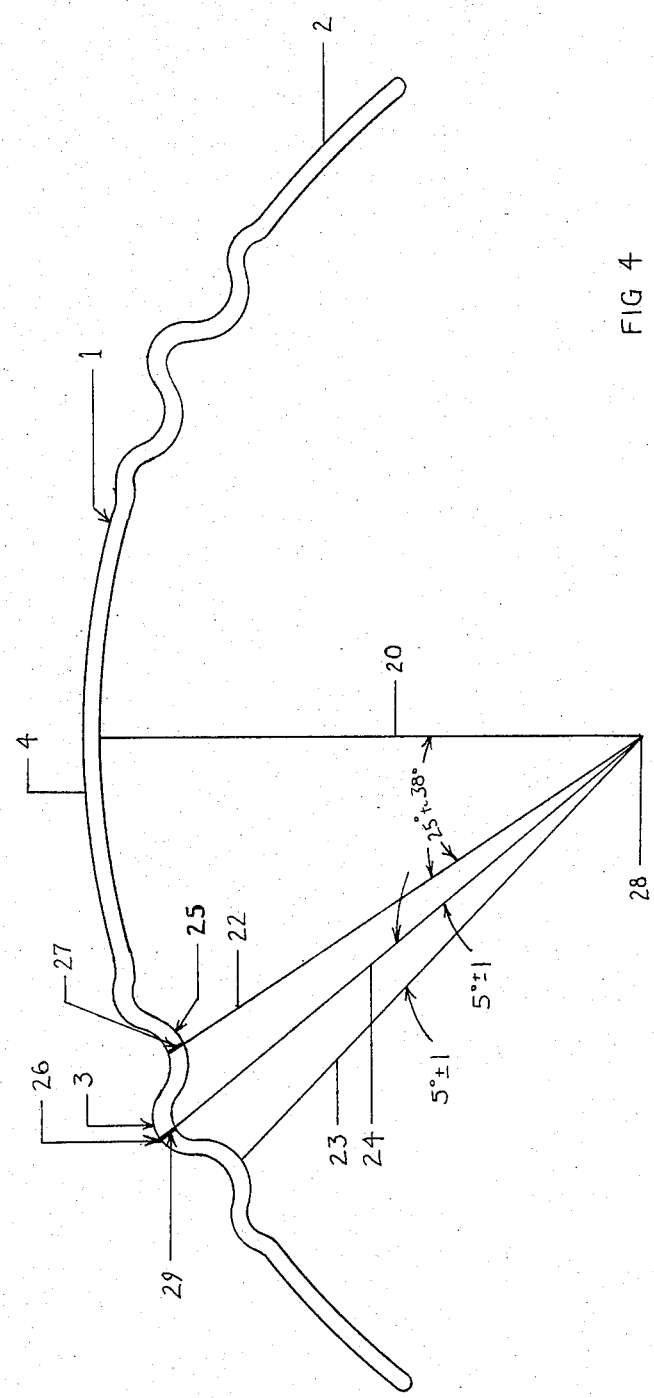
FIG. 4 is a more detail look at lens 1 in FIG. 1.

A central angle which is formed by the intersection of lines 20 and 22, as shown in FIG. 4, ranges between 25 and 38 degrees. Line 20 is defined as a line drawn between a point 28 which is the geometric center of a sphere, of which the optical zone 4 is a portion of the surface of said sphere, and a point on the optical zone 4, which is equidistantfrom a point on an annular line 27 that symmetrically bisects the convex zone 25. Whereas line 22 is defined as a line drawn between point 28 and any point on annular line 27.

A second angle of 4 to 6 degrees is formed by the intersection of line 22 and line 24 wherein line 24 is defined as a line drawn between point 28 and any point on annular line 29 which symmetrically bisects concave surface 26.

The arrangement described is such that a lens of this kind can be economically produced and hence can be sold cheaply and as a result it can be discarded after a relatively short period of use. The structure of the lens is such that the fitting procedure is greatly simplified so that the lens can be fitted quickly and by persons with relatively little optical experience.

The continued flow of tear fluid 8 and oxygen behind the lens 1 and over the cornea 5 of the eye 6 without corneal contact by the optical zone 4 is highly advantageous and provides in many cases for the correction of corneal irregularities and resultant corneal astigmatism.

In addition, the fact that the optical zone 4 need not be deformed to create the pumping action allows the use of a non-deformable material which can have better controlled optical properties. Conditions of edema produced by colds, menstrual periods and fluid imbalance; and use of the lens as a shield during conditions of infection between or adhesions between lid and cornea are accommodated by the invented structure. Such accommodation is due to the responsiveness of the tear pump action to physiological changes without sensation and incidental irritation.

The foregoing description is intended to be merely illustrative of the preferred embodiment of the invention and other embodiments, within the scope of this invention will be apparent to those skilled in the art.

What is claimed is:

1. A semi-rigid polymeric corneal contact lens made to float upon and adhere to the cornea comprising a transparent, non-contacting, non-distorting central optical lens zone adapted to conform with the cornea and float on tear fluid, said central optical zone having an optical center, and inner and outer surface with the inner surface adjacent the tear fluid, and an intermediate reticulated zone of the same material as the central zone and of substantially uniform thickness but with at least one concave and one convex surface in relation to the cornea which is in the shape of a bellows to provide limited axial movement of the central zonea whenever an eyelid blink transmits a force to the central zone which displaces the intermediate zone in an axial inward direction with the cornea of the eye, without actually touching the cornea, to effect out flow of tear fluid from a fluid chamber, between the cornea and the eye, and at the completion of the blink to restore the central zone to an initial equilibrium position thereby creating a pressure differential to draw fresh tear fluid back into the tear chamber.

2. A semi-rigid polymeric corneal contact lens made to float upon and adhere to the cornea comprising a transparant, non-contacting, non-distorting central optical lens zone adapted to conform with the cornea and float on tear fluid, said central optical zone having an optical center, and inner and outer surface with the inner surface adjacent the tear fluid, and an intermediate reticulated zone of the same material as the central zone and of substantially uniform thickness but with at least one concave and one convex surface in relation to the cornea which is in the shape of a bellows to provide limited axial movement of the central zone whenever an eyelid blink transmits a force to the central zone which displaces the intermediate zone in an axial inward direction with the cornea of the eye, without actually touching the cornea, to effect out flow of tear fluid from a fluid chamber, between the cornea and the eye, and at the completion of the blink to restore the central zone to an initial equilibrium position thereby creating a pressure differential to draw fresh tear fluid back into the tear chamber, said lens further having a first central angle of a minium of 25 degrees and a maximum of 38 degrees with said angle being defined by an intersection of two lines, both lines intersecting at a point which is equidistant from all points on the inner surface of the central zone, the first line also passing through the optical center of the central zone and the second line also passing through a point located on an annular line symmetrically bisecting the convex surface adjacent the central zone.

3. The contact lens of claim 2 wherein the intermediate zone is a different material from the central zone and a rubberlike material in nature to supply the deforming and restoring actions needed to pump the tear fluid.

4. The contact lens of claim 1 wherein the intermediate zone in relation to the cornea has a first convex surface adjacent to the central zone and the concave surface adjacent the first convex surface with a second convex surface adjacent said concave surface and said lens further having a second central angle of a minium of 4 degrees and a maximum angle of 6 degrees formed by two intersecting lines both lines of which intersect at a point equidistant from all points on the inner surface of the central zone with one line also intersecting the annular line that symmetrically bisects the convex surface adjacent the central zone and the other line also intersecting with the annular line that symmetrically bisects the concave surface adjacent the convex surface.

* * * * *